(12) United States Patent
Han et al.

(10) Patent No.: US 12,437,565 B2
(45) Date of Patent: Oct. 7, 2025

(54) APPARATUS AND METHOD FOR AUTOMATICALLY GENERATING IMAGE CAPTION BY APPLYING DEEP LEARNING ALGORITHM TO AN IMAGE

(71) Applicant: KOREA ADVANCED INSTITUTE OF SCIENCE AND TECHNOLOGY, Daejeon (KR)

(72) Inventors: Seung Ho Han, Daejeon (KR); Ho Jin Choi, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 360 days.

(21) Appl. No.: 17/925,354

(22) PCT Filed: Jun. 16, 2020

(86) PCT No.: PCT/KR2020/007755
§ 371 (c)(1),
(2) Date: Nov. 15, 2022

(87) PCT Pub. No.: WO2021/256578
PCT Pub. Date: Dec. 23, 2021

(65) Prior Publication Data
US 2023/0177854 A1    Jun. 8, 2023

(51) Int. Cl.
G06V 20/70    (2022.01)
G06F 40/44    (2020.01)
G06T 7/90    (2017.01)
G06V 10/44    (2022.01)
(Continued)

(52) U.S. Cl.
CPC ............. *G06V 20/70* (2022.01); *G06F 40/44* (2020.01); *G06T 7/90* (2017.01); *G06V 10/44* (2022.01);
(Continued)

(58) Field of Classification Search
None
See application file for complete search history.

(56) References Cited

U.S. PATENT DOCUMENTS 9,836,671 B2 * 12/2017 Gao ..................... G06F 18/22
10,198,671 B1    2/2019 Yang et al.
(Continued)

FOREIGN PATENT DOCUMENTS

KR    10-2011-0033179    3/2011
KR    10-2013-0127458    11/2013
(Continued)

OTHER PUBLICATIONS

Machine Translation in English of Korean Prior art Pub (KR 101930940) to Lim et al.*
PCT International Search Report for PCT Application No. PCT/KR2020/007755, dated Mar. 5, 2021.

*Primary Examiner* — Haris Sabah
(74) *Attorney, Agent, or Firm* — Schmeiser, Olsen & Watts LLP (57) ABSTRACT

An apparatus and method for automatically generating an image caption is provided capable of giving an explanation by using Bayesian inference and an image area-word mapping module on the basis of a deep learning algorithm. An apparatus for automatically generating an image caption, according to one embodiment of the present invention, includes: an automatic caption generation module for creating a caption by applying a deep learning algorithm to an image received from a client; a caption basis generation module for creating a basis for the caption by mapping a partial area in the image received from the client with respect to important words in the caption received from the automatic caption generation module; and a visualization module for visualizing the caption received from the automatic caption generation module and the basis for the (Continued)

caption received from the caption basis generation module to return same to the client.

7 Claims, 7 Drawing Sheets

(51) Int. Cl.
 *G06N 3/02* (2006.01)
 *G06V 10/70* (2022.01)
(52) U.S. Cl.
 CPC ...... *G06N 3/02* (2013.01); *G06T 2207/10024* (2013.01); *G06T 2207/20081* (2013.01); *G06T 2207/20084* (2013.01); *G06V 10/768* (2022.01); *G06V 2201/07* (2022.01)

(56) References Cited

U.S. PATENT DOCUMENTS

| | | | |
|---|---|---|---|
| 2017/0200065 A1* | 7/2017 | Wang | G06V 10/764 |
| 2017/0200066 A1* | 7/2017 | Wang | G06N 3/045 |
| 2018/0181281 A1* | 6/2018 | Suki | G09B 29/007 |
| 2019/0227988 A1* | 7/2019 | Kwon | G06V 20/35 |

FOREIGN PATENT DOCUMENTS

| | | |
|---|---|---|
| KR | 10-1930940 B1 | 12/2018 |
| KR | 10-1996371 B1 | 7/2019 |
| KR | 10-2019-0108378 A | 9/2019 |
| KR | 10-2020-0065832 A | 6/2020 |
| KR | 10-2020-0106115 A | 9/2020 |

* cited by examiner

APPARATUS AND METHOD FOR AUTOMATICALLY GENERATING IMAGE CAPTION BY APPLYING DEEP LEARNING ALGORITHM TO AN IMAGE

CROSS-REFERENCE TO RELATED APPLICATIONS

This application claims priority to PCT Application No. PCT/KR2020/007755, having a filing date of Jun. 16, 2020, the entire contents of which are hereby incorporated by reference.

FIELD OF TECHNOLOGY

The following relates to an apparatus and method for automatically generating an image caption capable of giving an explanation using an image area-word mapping module and Bayesian inference based on a deep learning algorithm.

BACKGROUND

Image captioning (or image annotation) may refer to generating a caption describing an image received from a user. Before the development of various technologies of artificial intelligence, image captioning was performed directly by humans, but recently, with an increase in computing power and the development of artificial intelligence technologies such as machine learning and the like, technologies for automatically generating captions using a machine are being developed.

In the conventional technologies for automatically generating captions, attempts have been made to describe an image using a plurality of labels for the image by searching for the same images having the same label using many existing images and label information for each image or by assigning labels of similar images to one image.

As an example of the technology for generating captions using a machine, in Korean Patent Application Publication No. 10-2011-033179 (hereinafter, referred to as "Related Art 1") entitled "Image annotation," for an input image, one or more nearest-neighbor images associated with the corresponding image and the label of the image are found from among a set of stored images, and annotations are made by assigning a label of each selected image as multiple labels for the input image. In the case of the nearest-neighbor images associated with the input image, features of all the images are extracted, distances between the extracted features are calculated by learning a distance derivation algorithm, and finally, a plurality of related labels for the input image are generated. However, in Related Art 1, since the annotation on the generated image does not take the form of a complete sentence and is a list of simply related words, it is difficult to see it as a description of a given input image.

As another example related to the technology for automatically generating captions, there may be Korean Patent Publication No. 10-2013-0127458 (hereinafter, referred to as "Related Art 2") entitled "Technology for annotating a street view image using context information." In Related Art 2, for a street view, which allows a user to view a surrounding environment of a specific position at a street level, object metadata that is arranged in a vertical arrangement state with respect to a street view image having one or more objects is generated using metadata for objects in the street view, and finally, a street view image having an annotation is generated and provided to the user. However, in the case of Related Art 2, similar to Related Art 1, a label for each object in the street view image is generated rather than in the form of the complete sentence describing the entire input image, and the input image also has a limitation of being limited to the street view image.

The above-described background art is technical information possessed by the inventor for the derivation of embodiments of the present invention or acquired in the process of the derivation of embodiments of the present invention, and cannot necessarily be said to be a known technique disclosed to the general public prior to the filing of embodiments of the present invention.

SUMMARY

An aspect relates to providing a technology for generating, for a new image provided by a user, a complete caption describing the image by utilizing object information in the image.

Further, embodiments of the present invention are also directed to providing, in order to solve a problem of difficulty in interpreting results appearing in a learning model using a deep learning algorithm, a technology for providing a description of results of an automatic image caption generation model to a user so that the user can know a basis for the results generated by the trained deep learning model.

One aspect of embodiments of the present invention provides an apparatus for automatically generating an image caption, which includes an automatic caption generation module configured to generate a caption by applying a deep learning algorithm to an image received from a client; a caption basis generation module configured to generate a basis for the caption by mapping a partial area in the image received from the client with respect to important words in the caption received from the automatic caption generation module; and a visualization module configured to visualize the caption received from the automatic caption generation module and the basis for the caption received from the caption basis generation module to return the visualized caption and basis to the client.

The automatic caption generation module may include an image feature extraction module configured to extract an image feature vector from the image received from the client using a convolutional neural network (CNN) algorithm; and a language generation module configured to pre-train a predefined image feature vector and an actual caption (ground truth) for the predefined image feature vector and generate the caption corresponding to a result of the training with respect to the image feature vector extracted by the image feature extraction module.

The caption basis generation module may include an object recognition module configured to recognize one or more objects included in the image received from the client and extract one or more object areas; an image area-word mapping module configured to train a relevance between words in the caption generated by the automatic caption generation module and each of the object areas extracted by the object recognition module using a deep learning algorithm, and output a weight matrix as a result of the training; and an interpretation reinforcement module configured to extract a word having a highest weight for each object area from the weight matrix received from the image area-word mapping module, and calculate a posterior probability for each word.

The visualization module may display the one or more object areas and the caption on the image received from the client, display the words in the caption corresponding to the object areas as the basis for the caption with the same color as the object areas, and return an output image indicating a relevance value between the words having the same color as the object areas to the client.

Another aspect of embodiments of the present invention provides a method of automatically generating an image caption, which includes generating, by an automatic caption generation module, a caption by applying a deep learning algorithm to an image received from a client; generating, by a caption basis generation module, a basis for the caption by mapping a partial area in the image received from the client with respect to important words in the caption received from the automatic caption generation module; and visualizing, by a visualization module, the caption received from the automatic caption generation module and the basis for the caption received from the caption basis generation module to return the visualized caption and basis to the client.

The generating of the caption may include extracting, by an image feature extraction module, an image feature vector from the image received from the client using a CNN algorithm; and pre-training, by a language generation module, a predefined image feature vector and an actual caption (ground truth) for the predefined image feature vector and generating the caption corresponding to a result of the training with respect to the image feature vector extracted by the image feature extraction module.

The generating of the basis may include recognizing, by an object recognition module, one or more objects included in the image received from the client and extracting one or more object areas; training, by an image area-word mapping module, a relevance between words in the caption generated by the automatic caption generation module and each of the object areas extracted by the object recognition module using a deep learning algorithm, and outputting a weight matrix as a result of the training; and extracting, by an interpretation reinforcement module, a word having a highest weight for each object area from the weight matrix received from the image area-word mapping module, and calculating a posterior probability for each word.

The returning of the visualized caption and basis may include displaying, by the visualization module, the one or more object areas and the caption on the image received from the client, and by the visualization module, displaying the words in the caption corresponding to the object areas as the basis for the caption with the same color as the object areas, and returning an output image indicating a relevance value between the words having the same color as the object areas to the client.

In addition, another method for implementing embodiments of the present invention, another system for implementing embodiments of the present invention, and a computer program or a computer program product (non-transitory computer readable storage medium having instructions, which when executed by a processor, perform actions) for executing the above method of embodiments of the present invention may be further provided.

Other aspects, features, and advantages other than those described above will become apparent from the following drawings, claims, and detailed description of embodiments of the present invention.

According to embodiments of the present invention, when a language generation module is trained to generate a caption by reflecting important object information in an input image, rather than generating a caption based only on the image and a caption database for a new image, by defining an image-caption loss value and giving learning feedback through the image-caption loss value, the performance of caption generation for a new image can be improved.

Further, it is possible to address the limitations of a deep learning algorithm model, which has difficulty in interpreting results, by presenting a basis for a caption generated through an image area-word mapping module using a deep learning algorithm and Bayesian inference.

Effects of embodiments of the present invention are not limited to the above-described effects and other objects that are not described may be clearly understood by those skilled in the art from this specification and the accompanying drawings.

BRIEF DESCRIPTION

Some of the embodiments will be described in detail, with reference to the following figures, wherein like designations denote like members, wherein.

DETAILED DESCRIPTION

Advantages and features of embodiments of the present invention and methods of achieving the same will be clearly understood with reference to the accompanying drawings and embodiments described in detail below. However, embodiments of the present invention are not limited to the embodiments to be disclosed below, and may be implemented in various different forms. It should be understood that embodiments of the present invention covers all modifications, equivalents, and alternatives falling within the spirit and scope of embodiments of the present invention. The embodiments are provided in order to fully explain the present embodiments and fully explain the scope of embodiments of the present invention to those skilled in the art. In descriptions of embodiments of the present invention, when detailed descriptions of related known configurations or functions are deemed to unnecessarily obscure the gist of embodiments of the present invention, they will be omitted.

The terminology used herein is for the purpose of describing particular embodiments only and is not intended to limit to the present invention. As used herein, the singular forms "a" and "an" are intended to also include the plural forms, unless the context clearly indicates otherwise. It should be further understood that the terms "comprise," "comprising," "include," and/or "including," when used herein, specify the presence of stated features, integers, steps, operations, elements, parts, or combinations thereof, but do not preclude the presence or addition of one or more other features, integers, steps, operations, elements, parts, or combinations thereof. The terminology used herein is for the purpose of describing particular embodiments only and is not intended to limit to the present invention.

Hereinafter, embodiments of the present invention will be described in detail with reference to the accompanying drawings, and in the description with reference to the accompanying drawings, the same or corresponding components are denoted by the same reference numerals, and thus the description thereof will not be repeated.

Figure 1:
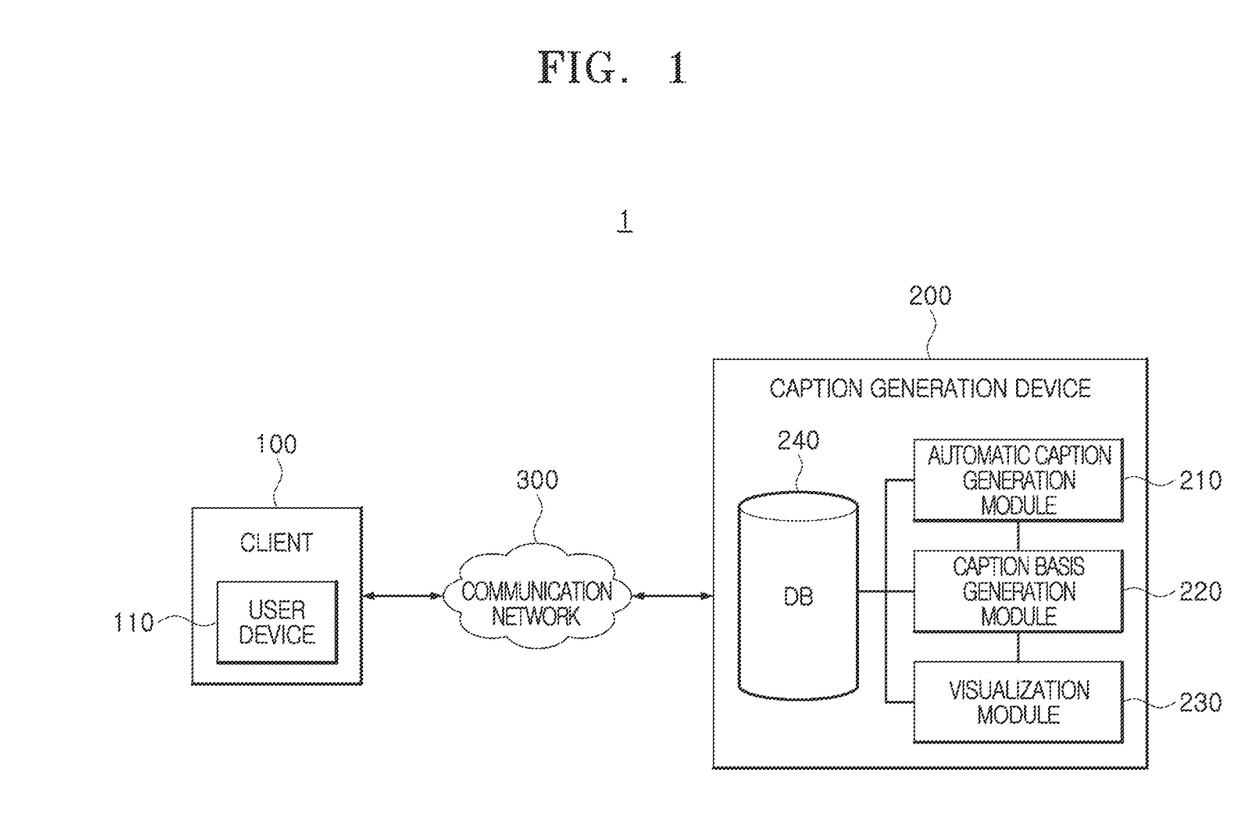
FIG. 1 is a schematic diagram for describing an apparatus for automatically generating an image caption according to an embodiment of the present invention.

FIG. 1 is a schematic diagram for describing an apparatus for automatically generating an image caption according to an embodiment of the present invention. Referring to FIG. 1, an apparatus 1 for automatically generating an image caption may include a client 100, a caption generation device 200, and a communication network 300.

The client 100 is a user providing an image to be processed, and may provide the image through a user device 110. In the present embodiment, examples of the user device 110 may include desktop computers, smartphones, notebook computers, tablet personal computers (PCs), smart televisions (TVs), cellular phones, personal digital assistants (PDAs), laptop computers, media players, micro servers, global positioning system (GPS) devices, electronic book (e-book) terminals, digital broadcasting terminals, navigation systems, kiosks, MPEG audio layer-3 (MP3) players, digital cameras, home appliances, and other mobile or non-mobile computing devices, which are operated by the user, but embodiments of the present invention are not limited thereto. Further, the user device 110 may be a wearable terminal such as a watch, glasses, a hair band, a ring, etc. having a communication function and a data processing function.

The caption generation device 200 may process the image received from the client 100 to return a result of the processing to the client 100, and may output a caption for the received image together with a basis for the caption. In the present embodiment, the caption generation device 200 may include an automatic caption generation module 210, a caption basis generation module 220, a visualization module 230, and a database 240.

The automatic caption generation module 210 may generate a caption by applying a deep learning algorithm to the image received from the client 100. The caption basis generation module 220 may map a partial area in the image received from the client 100 with respect to important words in a sentence of the caption to present a basis for the caption generated by the automatic caption generation module 210. The visualization module 230 may visualize the caption received from the automatic caption generation module 210 and the basis for the caption received from the caption basis generation module 220 to return the visualized caption and basis to the client 100.

The communication network 300 serves to connect the client 100 and the caption generation device 200. That is, the communication network 300 may be a communication network that provides a connection path so that the client 100 can access the caption generation device 200 and then transmit or receive predetermined information to or from the caption generation device 200. For example, the communication network 300 may include wired networks such as local area networks (LANs), wide area networks (WANs), metropolitan area networks (MANs), integrated service digital networks (ISDNs), etc., and wireless networks such as wireless LANs, code division multiple access (CDMA) networks, Bluetooth, satellite communication networks, etc., but the scope of embodiments of the present invention are not limited thereto. Further, the communication network 300 may transmit or receive information using short-distance communication and/or long-distance communication. Here, examples of the short-distance communication may include Bluetooth, radio frequency identification (RFID), infrared data association (IrDA), ultra-wideband (UWB), Zigbee, and Wi-Fi technologies, and examples of the long-distance communication may include CDMA, frequency division multiple access (FDMA), time division multiple access (TDMA), orthogonal FDMA (OFDMA), and single carrier FDMA (SC-FDMA) technologies.

The caption generation device 200 may be implemented by a computing device including one or more processors.

As is conventional in the art, some exemplary embodiments may be illustrated in the accompanying drawings in terms of functional blocks, units, and/or modules. Those skilled in the art will understand that the functional blocks, units, and/or modules are physically implemented by electronic (or optical) circuits, such as logic circuits, discrete components, processors, hard-wired circuits, memory elements, and wiring connections. When these blocks, units, and/or modules are implemented by processors or other similar hardware, these blocks, units, and/or modules may be programmed and controlled using software (e.g., code) to perform various functions discussed herein. Further, each block, unit, and/or module may be implemented by dedicated hardware, or may be implemented as a combination of dedicated hardware for performing some functions and a processor (e.g., one or more programmed processors and associated circuits) for performing other functions. Further, each block, unit, and/or module of some exemplary embodiments may be physically divided into two or more interacting and discrete blocks, units, and/or modules without departing from the scope of the inventive concept. Further, blocks, units, and/or modules of some exemplary embodiments may be physically combined into more complex blocks, units, and/or modules without departing from the scope of the inventive concept.

Figure 2:
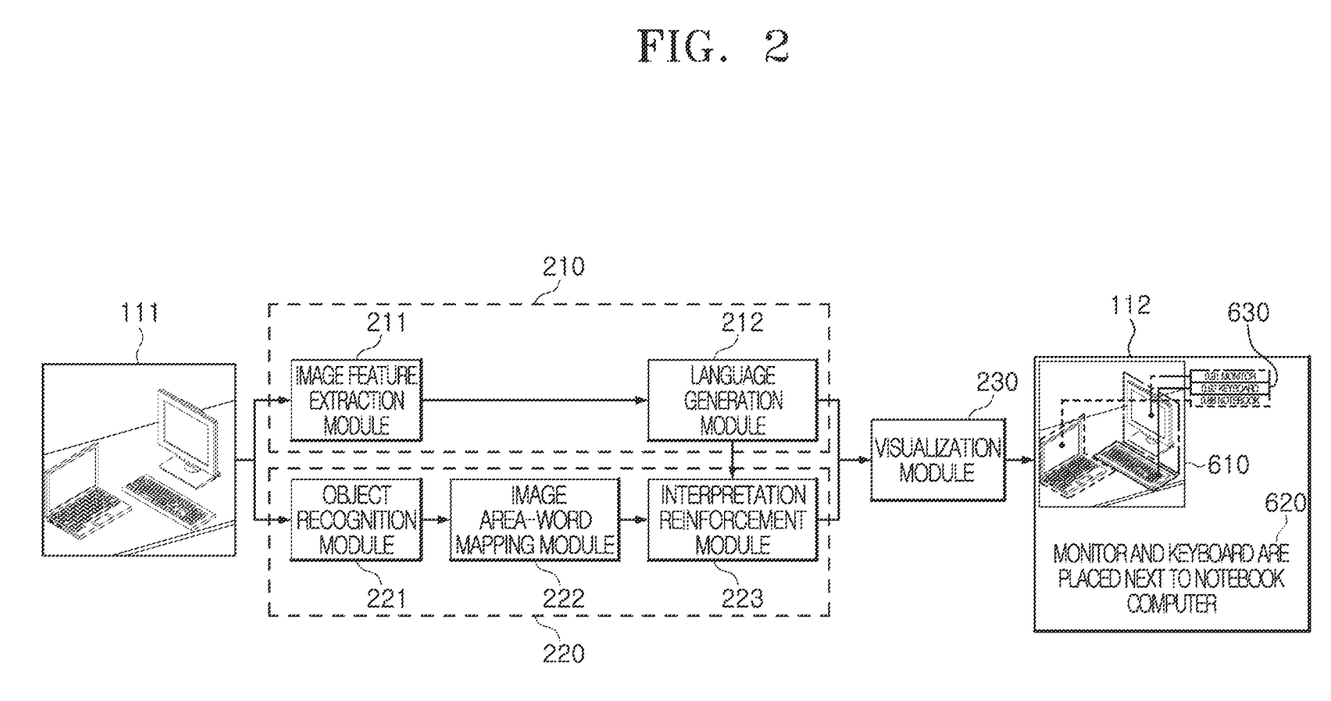
FIG. 2 is a diagram illustrating a configuration of a caption generation device illustrated in FIG. 1 and a procedure of generating a final result.

FIG. 2 is a diagram illustrating a configuration of the caption generation device illustrated in FIG. 1 and a procedure of generating a final result. In the following description, a description of FIG. 2, which is the same as the description of FIG. 1, will be omitted.

Referring to FIG. 2, the caption generation device 200 may receive an input image 111 from the client 100.

The automatic caption generation module 210 may generate a caption by applying a deep learning algorithm to the input image 111 received from the client 100. In the present embodiment, the automatic caption generation module 210 may include an image feature extraction module 211 and a language generation module 212.

The image feature extraction module 211 may extract image features in the form of a vector from the input image 111 using a convolutional neural network (CNN) algorithm.

The language generation module 212 may generate a caption sentence for the image features in the form of the vector extracted by the image feature extraction module 211. In order for the language generation module 212 to generate the caption sentence, it is necessary for the module to precede with training for parameters on the basis of many predefined image feature vectors and actual caption sentences (ground truth) therefor. Therefore, the language generation module 212 may generate a caption sentence corresponding to a result of the training with respect to the image features in the form of the vector extracted by the image feature extraction module 211.

The caption basis generation module 220 may map a partial area in the image received from the client 100 with respect to important words in the caption sentence to present a basis for the caption sentence generated by the automatic caption generation module 210. In the present embodiment, the caption basis generation module 220 may include an object recognition module 221, an image area-word mapping module 222, and an interpretation reinforcement module 223.

The object recognition module 221 may recognize one or more objects (e.g., a person, an object, etc.) included in the input image 111 and extract an object area.

The image area-word mapping module 222 may train a relevance between some words in the caption generated by the language generation module 212 and each object area in the input image 111 extracted by the object recognition module 221 using a deep learning algorithm, and output a weight matrix as a result of the training. In the present embodiment, in order for the image area-word mapping module 222 to perform the above-described function, pre-training should take precedence.

The interpretation reinforcement module 223 may extract the most relevant word (word having a highest weight for all the words) for each object area from the vector matrix generated by the image area-word mapping module 222, and calculate a posterior probability through Bayesian inference using a priori probability distribution and a likelihood probability distribution defined in the database 240 for each word.

The visualization module 230 may use the caption, which is output from the language generation module 212, and the vector matrix of the relevance between the object area and the word, which is output from the image area-word mapping module 222, to find a word determined to have the highest relevance for each object area from the vector matrix, and with respect to the selected object area and word, the object area may be displayed by displaying a colored bounding box on the image, and the word may be displayed by coloring the word in the same color as the bounding box. Therefore, as final output results of the visualization module 230, the bounding box of the same color and a caption including the colored word for related words may be displayed together for each object area.

Figure 3:
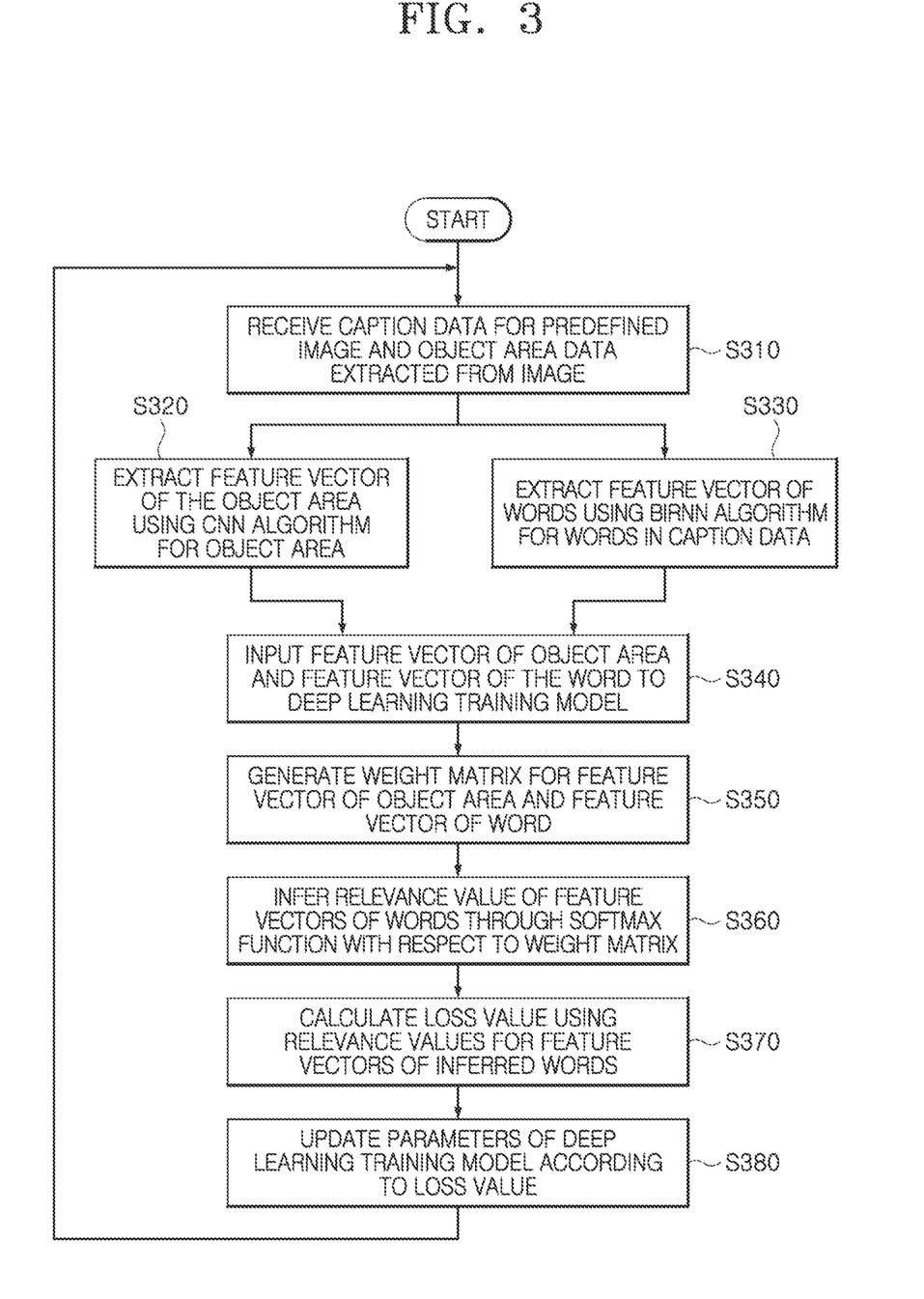
FIG. 3 is a flowchart showing a training method of an image area-word mapping module illustrated in FIG. 2.

FIG. 3 is a flowchart showing a training method of the image area-word mapping module 222 illustrated in FIG. 2. In the following description, a description of FIG. 3, which is the same as the description of FIGS. 1 and 2, will be omitted.

Referring to FIG. 3, in operation S310, the image area-word mapping module 222 receives caption data for a predefined image and object area data that is extracted from the image from the database 240. In the present embodiment, the predefined image, the object area for the image, and the caption data for the image may be stored in the database 240.

In operation S320, the image area-word mapping module 222 extracts features in the form of a vector, that is, a feature vector of the object area, using a CNN algorithm for the object area, and at the same time, in operation S330, the image area-word mapping module 222 extracts features in the form of a vector of the same dimension as the above feature in the form of a vector, that is, a feature vector of words for the object area, using a bi-directional recurrent neural network (BiRNN) algorithm for words in the caption data. Here, the words used when the image area-word mapping module 222 extracts the features in the form of the vector for the words in the caption data may include words remaining after undergoing a preprocessing operation of removing articles or pronouns.

In operation S340, the image area-word mapping module 222 inputs the feature vector of the object area and the feature vector of the word to a deep learning training model.

In operation S350, the deep learning training model included in the image area-word mapping module 222 performs forward propagation on the feature vector of the object area and the feature vector of the word to generate a weight matrix obtained by multiplying the feature vector of the object area, the feature vector of the word, and a model weight.

In operation S360, the deep learning training model included in the image area-word mapping module 222 infers a relevance value of the feature vectors of the words through a softmax function with respect to the generated weight matrix. Here, the relevance value is a value between 0 to 1, and the sum of relevance values assigned to the feature vectors of all the words may be 1. Further, as the relevance value is close to 1, it may mean that the relevance to the feature vector of the object area is increased. For example, when a label for the object area is <monitor> and the input words are <monitor>, <next to>, <laptop>, and <keyboard> with respect to the input image 111 of FIG. 2, the image area-word mapping module 222 may assign a high value (e.g., 0.9) to the most relevant word <monitor>, and divide and assign 0.1 to the remaining words.

In operation S370, the deep learning training model included in the image area-word mapping module 222 calculates a loss value using the relevance values for the feature vectors of the inferred words. The loss value is calculated using a root mean square deviation between the relevance values inferred by the deep learning training model, an actual category of the feature vector of the object area, and word embedding between the feature vectors of the words. Here, the word embedding may be pre-trained using all possible area categories defined in advance, and words constituting all captions of the database 240.

In operation S380, the deep learning training model included in the image area-word mapping module 222 updates the parameters of the deep learning training model through back propagation according to the calculated loss value. The image area-word mapping module 222 may repeatedly perform operations S310 to S380 for parameter optimization of the deep learning model.

Figure 4:
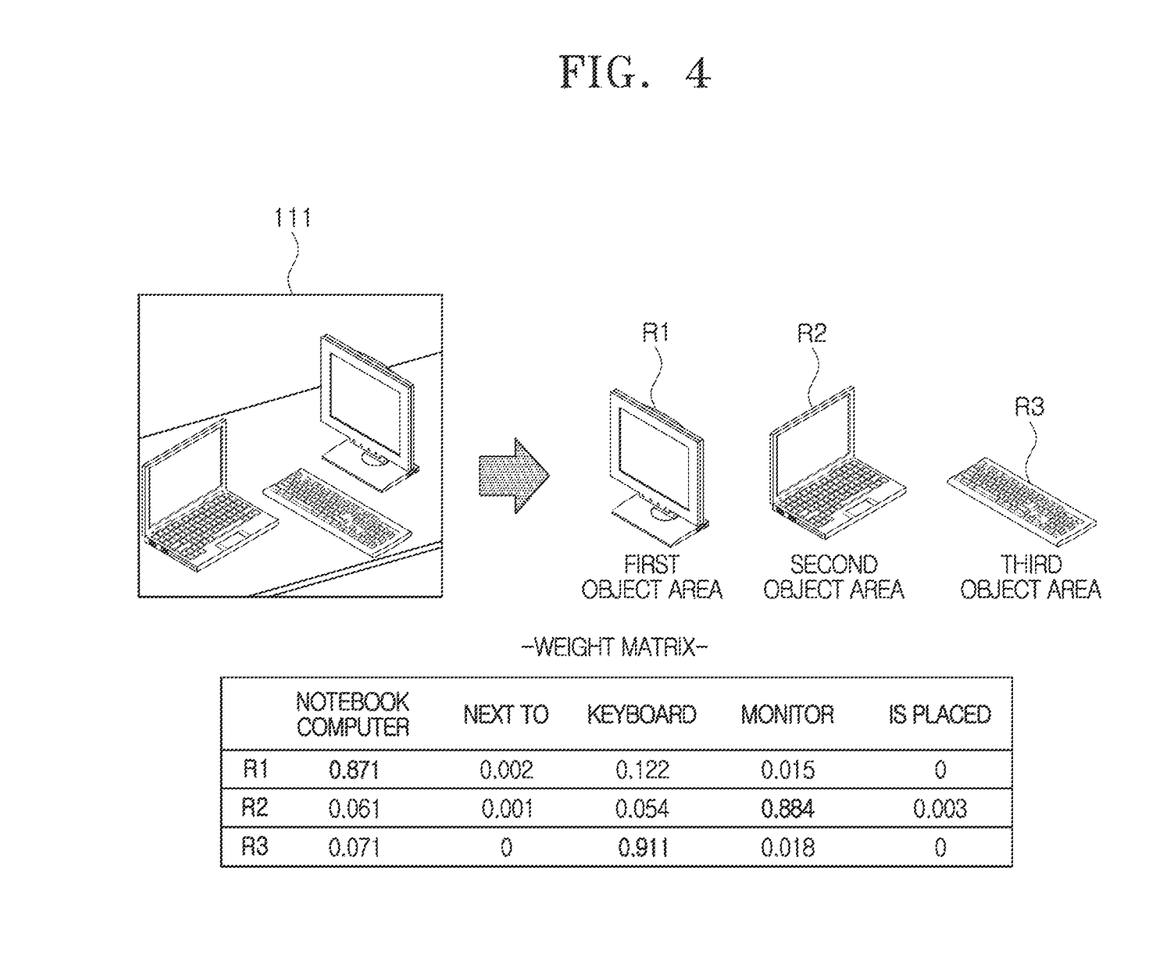
FIG. 4 is a diagram illustrating a processing example of the image area-word mapping module illustrated in FIG. 2.

FIG. 4 is a diagram illustrating a processing example of the image area-word mapping module 222 illustrated in FIG. 2. In the following description, a description of FIG. 4, which is the same as the description of FIGS. 1 to 3, will be omitted. Referring to FIG. 4, the image area-word mapping module 222 that receives a first object area R1, a second object area R2, and a third object area R3 which are extracted by the image feature extraction module 211 for the input image 111 received from the client 100 may convert each of the first to third object areas R1 to R3 into a feature vector. Further, the image area-word mapping module 222 that receives the caption generated by the language generation module 212 for the input image 111 received from the client 100 may convert the words remaining after the caption is preprocessed into the feature vector. The image area-word mapping module 222 may calculate the relevance of each word to each object area, that is, an attention score, through deep learning training to output the weight matrix.

Figure 5:
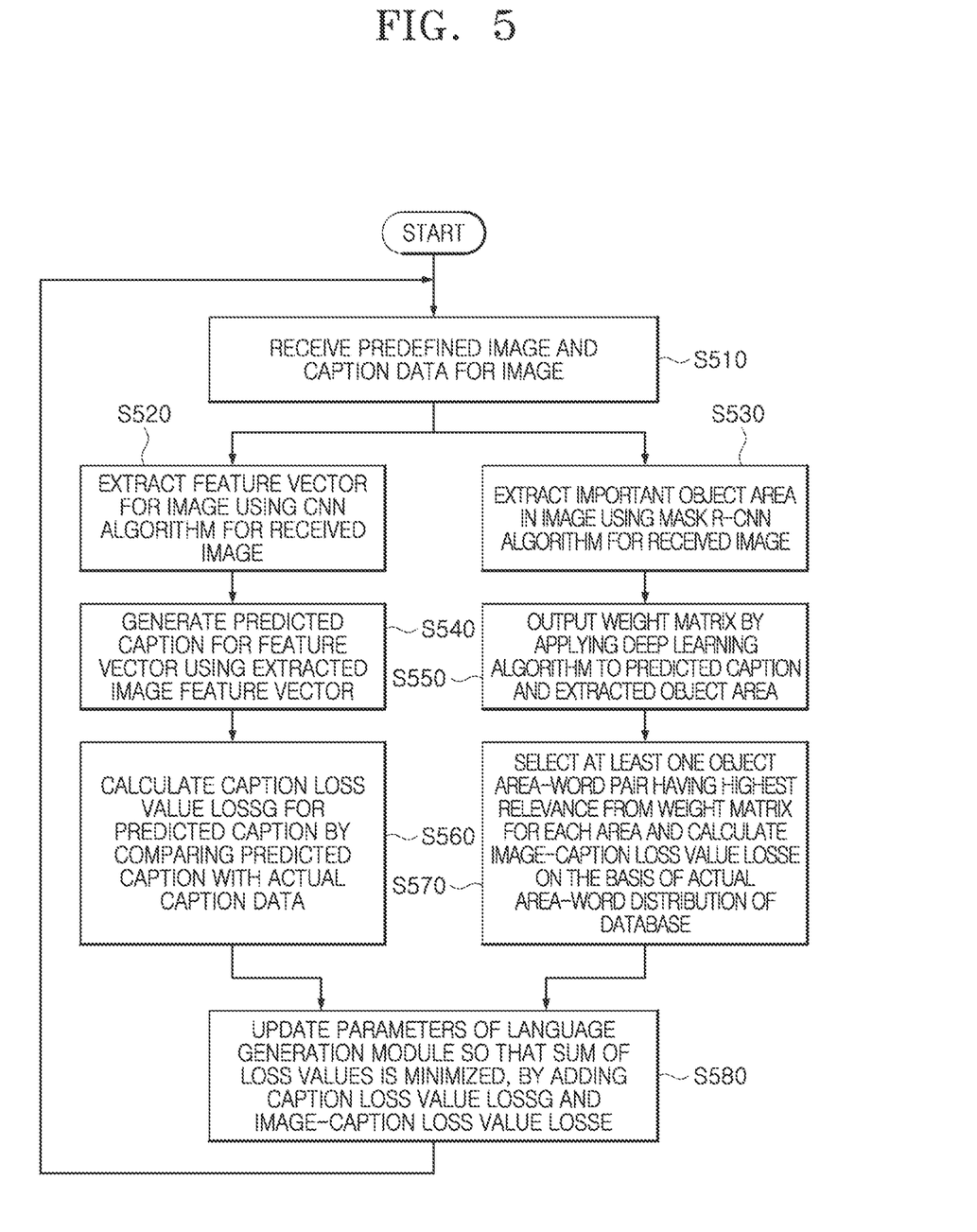
FIG. 5 is a flowchart showing a training method of the caption generation device illustrated in FIG. 1.

FIG. 5 is a flowchart showing a training method of the caption generation device illustrated in FIG. 1. In the following description, a description of FIG. 5, which is the same as the description of FIGS. 1 to 4, will be omitted.

Referring to FIG. 5, in operation S510, the caption generation device 200 receives a predefined image and caption data for the image from the database 240. In the present embodiment, the predefined image and the caption data for the image may be stored in the database 240.

In operation S520, the caption generation device 200 extracts a feature in the form of a vector, that is, a feature vector for the image using a CNN algorithm for the received image. Here, the extraction of the feature vector for the image may be performed by the image feature extraction module 211.

At the same time, in operation S530, the caption generation device 200 extracts an important object area in the image using a Mask R-CNN algorithm for the received image. Here, the extraction of the important object area in the image may be performed by the object recognition module 221.

In operation S540, the caption generation device 200 generates a caption for the feature vector using the extracted image feature vector. Here, the generation of the caption may be performed by the language generation module 212, and the caption generated using the image feature vector may be a predicted caption rather than an actual caption.

In operation S550, the caption generation device 200 outputs the weight matrix (see FIG. 4) by applying a deep learning algorithm to the predicted caption and the extracted object area. Here, the output of the weight matrix may be performed by the image area-word mapping module 222.

For training for the parameters of the caption generation device 200, in operation S560, the caption generation device 200 calculates a caption loss value $Loss_g$ for the predicted caption by comparing the predicted caption with actual caption data.

Further, in operation S570, the caption generation device 200 selects at least one object area-word pair having a highest relevance (attention score) from the weight matrix for each area, and calculates an image-caption loss value $Loss_e$ on the basis of an actual area-word distribution of the database 240. Here, the caption generation device 200 may calculate a conditional probability value that there will be a certain object area when a certain word is actually given in the database 240 for each object area-word pair, and may calculate an image-caption loss value $Loss_e$ by adding probability values for all object area-word pairs.

Further, calculating the probability that each object area for each word is in the distribution of the database 240 may be modeled using a deep learning algorithm (hereinafter, referred to as an interpretation reinforcement model (performed by the interpretation reinforcement module 223)). The interpretation reinforcement model receives the area-word pair feature vector determined to be relevant in the weight matrix output from the image area-word mapping module 222 as an input, and outputs a conditional probability value that an area exists when a word is given based on Bayes' theorem.

Expressing the above as an equation, it is a posterior probability $P(r_i|w_j)$, and the interpretation reinforcement module 223 infers the posterior probability $P(r_i|w_j)$ using Bayesian inference to obtain a posterior probability value. Therefore, using a distribution of a prior probability $P(r_i)$ and a distribution of a possibility probability $P(w_j|r_i)$ that can be obtained from the predefined database 240, the parameters may be pre-trained so that the interpretation reinforcement model outputs the distribution of the posterior probability $P(r_i|w_j)$ using Bayesian inference, and the image-caption loss value $Loss_e$ may be calculated by obtaining each posterior probability value for all the object area-word pairs given in the process of training by the caption generation device 200 and adding all values obtained by subtracting each posterior probability value from 1.

The image-caption loss value $Loss_e$ is expressed as Equation 1 below.

$$Loss_e = \sum_{i=1}^{n}\sum_{j=1}^{k}(1 - Pr(r_j | w_i))$$ [Equation 1]

The meaning of the image-caption loss value $Loss_e$ is a value quantified by evaluating whether the important words in the caption generated by the language generation module 212 well reflect the object information in the image. That is, when the caption generated for the image does not reflect the object information in the image well, the posterior probability value of the area for each word decreases and the image-caption loss value $Loss_e$ increases in the interpretation reinforcement module 223, and as a result, the training of the caption generation device 200 is accelerated. In the opposite case, the image-caption loss value $Loss_e$ may be lowered, and thus the training of the caption generation device 200 may be eased.

Finally, in operation S580, by adding the caption loss value $Loss_g$ and the image-caption loss value $Loss_e$, the parameters of the language generation module 212 in the caption generation device 200 are updated so that the sum of the loss values is minimized.

Figure 6:
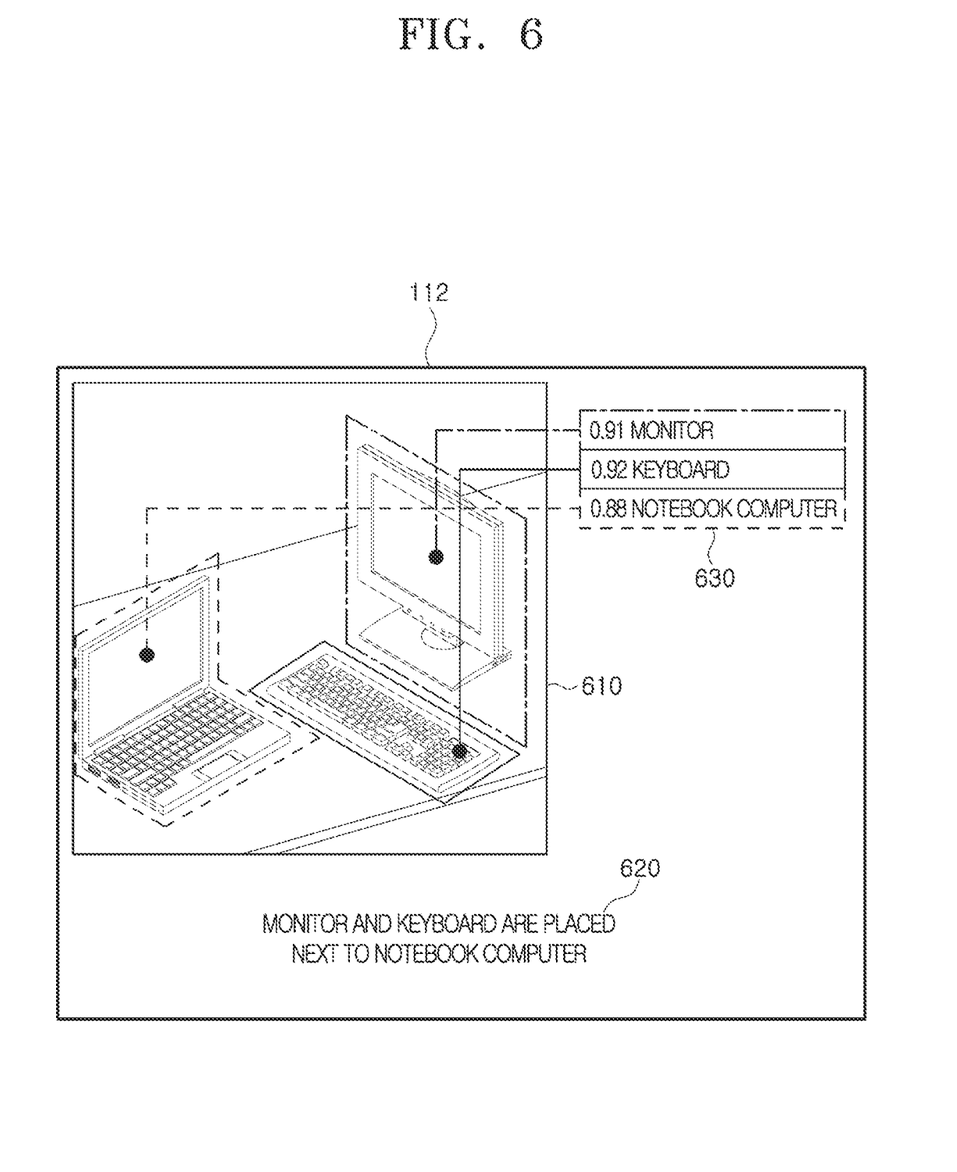
FIG. 6 is a diagram illustrating an output image returned by the caption generation device illustrated in FIG. 1 to a client.

FIG. 6 is a diagram illustrating an output image returned by the caption generation device illustrated in FIG. 1 to the client. In the following description, a description of FIG. 6, which is the same as the description of FIGS. 1 to 5, will be omitted.

Referring to FIG. 6, the visualization module 230 may display an important object area 610 on a result of the output image 112, and output and display a caption 620 generated by reflecting information on the object area. In this case, words in the caption in which the information on the object area is directly reflected may be displayed in the same color as the object area to present a basis for which the corresponding word is generated. Further, by displaying a relevance value (value between 0 and 1, 0: irrelevant, 1: very related) between the words having the same color as the corresponding object area on a small box 630 at the right, it is possible to quantify and show the relevance between the object area-words.

Figure 7:
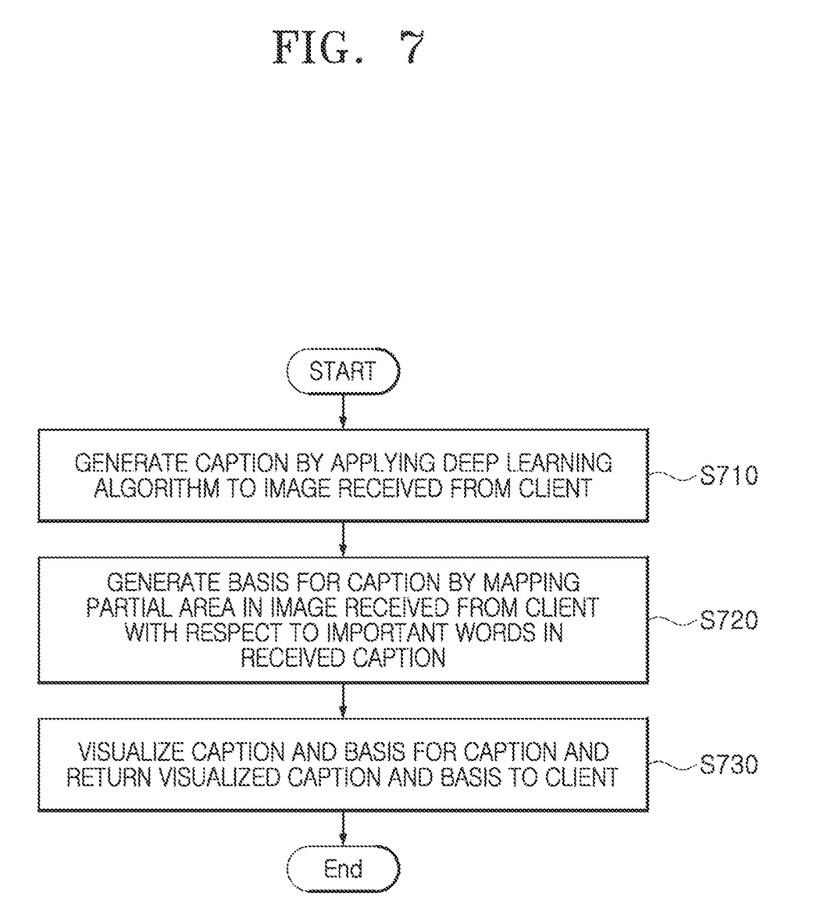
FIG. 7 is a flowchart showing a method of automatically generating an image caption according to an embodiment of the present invention.

FIG. 7 is a flowchart showing a method of automatically generating an image caption according to an embodiment of the present invention. In the following description, a description of FIG. 7, which is the same as the description of FIGS. 1 to 6, will be omitted.

Referring to FIG. 7, in operation S710, the caption generation device 200 generates a caption by applying a deep learning algorithm to an image received from the client 100. The caption generation device 200 may extract an image feature vector from the image received from the client 100 using a CNN algorithm. The caption generation device 200 may pre-train a predefined image feature vector and an actual caption (ground truth) thereof, and generate a caption corresponding to a result of the training with respect to the extracted image feature vector.

In operation S720, the caption generation device 200 generates a basis for the caption by mapping a partial area in the image received from the client 100 with respect to important words in the received caption. The caption generation device 200 may recognize one or more objects included in the image received from the client 100 and extract one or more object areas. The caption generation device 200 may train a relevance between words in the caption generated in operation S710 and each of the extracted object areas using a deep learning algorithm, and output a weight matrix as a result of the training. The caption generation device 200 may extract a word having a highest weight for each object area from the weight matrix, and calculate a posterior probability for each word.

In operation S730, the caption generation device 200 visualizes the caption and the basis for the caption and returns the visualized caption and basis to the client 100. The caption generation device 200 may display one or more object areas and the caption on the image received from the client 100, display the words in the caption corresponding to the object areas as the basis for the caption with the same color as the object areas, and return an output image indicating a relevance value between the words having the same color as the object areas to the client 100.

As an optional embodiment, the feature vector extracted from the image may be converted and extracted to have a specific dimension using a CNN algorithm.

As an optional embodiment, the caption may be generated through a recurrent neural network (RNN) algorithm using the image features extracted above, and the method may include performing learning through the image, caption data, and the interpretation reinforcement module for the image, and inferring an explanatory sentence for a new image.

As an optional embodiment, an object recognition model called Mask R-CNN may be used for recognizing a specific object area in an input image.

As an optional embodiment, the method may further include, when a weight matrix is generated, transforming the recognized object areas and the words in a sentence of the caption generated above into vector representations of the same dimension using a BiRNN algorithm and a CNN algorithm, respectively, and calculating a word attention score for each area using the transformed vector representations.

The embodiments of the present invention described above may be implemented in the form of computer program that can be executed through various components on a computer, and such a computer program may be recorded on computer readable media. In this case, the computer readable media may include magnetic media such as a hard disk, a floppy disk, and a magnetic tape, optical media such as a compact disc read only memory (CD-ROM) and a digital video disc (DVD), magneto-optical media such as a floptical disk, and a hardware device, such as a read only memory (ROM), a random-access memory (RAM), or a flash memory, that is specially made to store and execute the program instructions.

Meanwhile, the computer program may be specially designed and prepared for the embodiments of the present invention or may be available well-known instructions for those skilled in the field of computer software. Examples of the computer program may include machine code generated by a compiler and high-level language code that can be executed in a computer using an interpreter and the like.

The operations of all methods described herein can be performed in any suitable order unless otherwise indicated herein or otherwise clearly contradicted by the context. Embodiments are not limited to the described order of the operations. The use of any and all examples, or exemplary language (e.g., "such as") provided herein, is intended merely to describe embodiments in detail and does not pose a limitation on the scope of embodiments unless otherwise claimed. Numerous modifications and adaptations will be readily apparent to one of ordinary skill in the art without departing from the spirit and scope of the present invention.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. An apparatus for automatically generating an image caption, the apparatus comprising:
   an automatic caption generation module configured to generate a caption by applying a deep learning algorithm to an image received from a client;
   a caption basis generation module configured to generate a basis for the caption by mapping a partial area in the image received from the client with respect to important words in the caption received from the automatic caption generation module; and
   a visualization module configured to visualize the caption received from the automatic caption generation module and the basis for the caption received from the caption basis generation module to return the visualized caption and basis to the client,
   wherein the caption basis generation module includes:
   an object recognition module configured to recognize one or more objects included in the image received from the client and extract one or more object areas;
   an image area-word mapping module configured to train a relevance between words in the caption generated by the automatic caption generation module and each of the object areas extracted by the object recognition module using a deep learning algorithm, and output a weight matrix as a result of the training; and
   an interpretation reinforcement module configured to extract a word having a highest weight for each object area from the weight matrix received from the image area-word mapping module, and calculate a posterior probability for each word.

2. The apparatus of claim 1, wherein the automatic caption generation module includes:
   an image feature extraction module configured to extract an image feature vector from the image received from the client using a convolutional neural network algorithm; and
   a language generation module configured to pre-train a predefined image feature vector and an actual caption (ground truth) for the predefined image feature vector and generate the caption corresponding to a result of the training with respect to the image feature vector extracted by the image feature extraction module.

3. The apparatus of claim 1, wherein the visualization module displays the one or more object areas and the caption on the image received from the client, displays the words in the caption corresponding to the object areas as the basis for the caption with the same color as the object areas, and returns an output image indicating a relevance value between the words having the same color as the object areas to the client.

4. A method of automatically generating an image caption, the method comprising:
- generating, by an automatic caption generation module, a caption by applying a deep learning algorithm to an image received from a client;
- generating, by a caption basis generation module, a basis for the caption by mapping a partial area in the image received from the client with respect to important words in the caption received from the automatic caption generation module; and
- visualizing, by a visualization module, the caption received from the automatic caption generation module and the basis for the caption received from the caption basis generation module to return the visualized caption and basis to the client,
- wherein the generating of the basis includes:
- recognizing, by an object recognition module, one or more objects included in the image received from the client and extracting one or more object areas;
- training, by an image area-word mapping module, a relevance between words in the caption generated by the automatic caption generation module and each of the object areas extracted by the object recognition module using a deep learning algorithm, and outputting a weight matrix as a result of the training; and
- extracting, by an interpretation reinforcement module, a word having a highest weight for each object area from the weight matrix received from the image area-word mapping module, and calculating a posterior probability for each word.

5. The method of claim 4, wherein the generating of the caption includes:
- extracting, by an image feature extraction module, an image feature vector from the image received from the client using a convolutional neural network algorithm; and
- pre-training, by a language generation module, a predefined image feature vector and an actual caption (ground truth) for the predefined image feature vector and generating the caption corresponding to a result of the training with respect to the image feature vector extracted by the image feature extraction module.

6. The method of claim 4, wherein the returning of the visualized caption and basis includes displaying, by the visualization module, the one or more object areas and the caption on the image received from the client, and by the visualization module, displaying the words in the caption corresponding to the object areas as the basis for the caption with the same color as the object areas, and returning an output image indicating a relevance value between the words having the same color as the object areas to the client.

7. A computer program product comprising a non-transitory computer readable storage medium having instructions, which when executed by a processor, executes the method of claim 4 using a computer.

* * * * *